Feb. 8, 1927. 1,617,209
W. GEBHARDT
RESILIENT DISK WHEEL
Filed Oct. 25, 1923   3 Sheets-Sheet 2
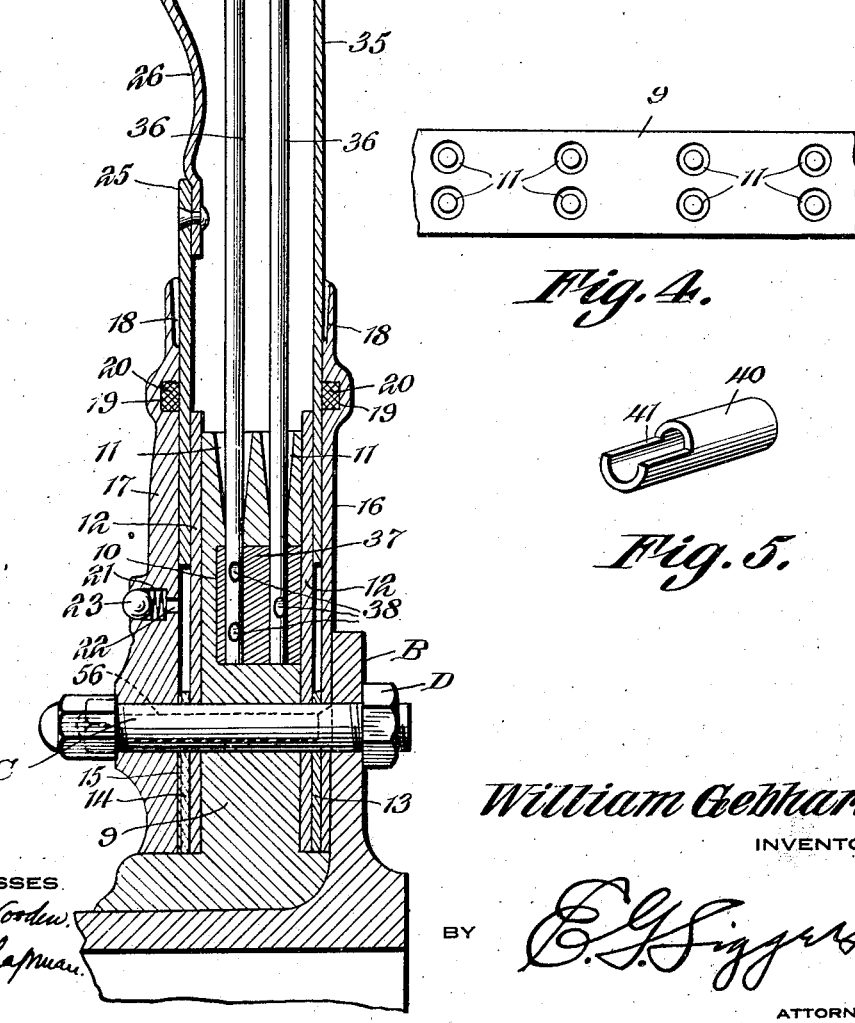
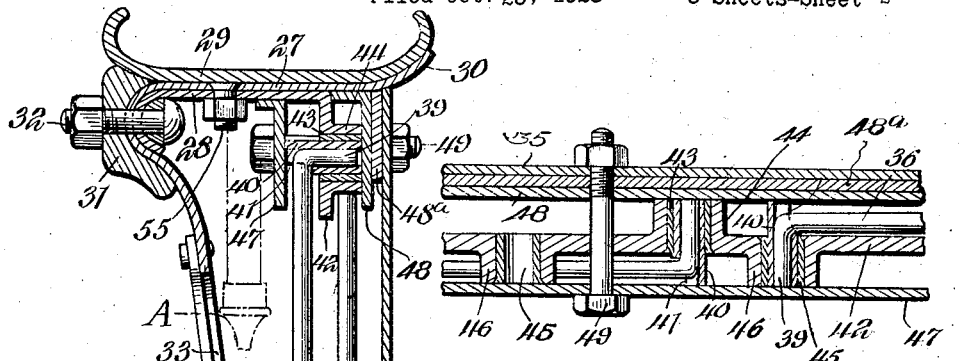
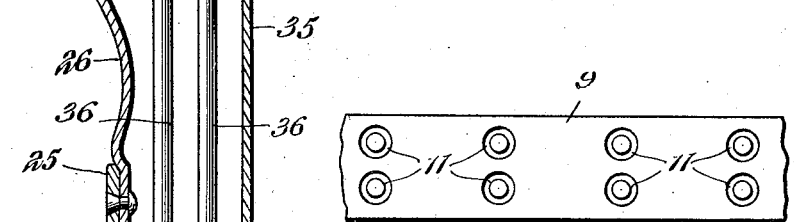
William Gebhardt
INVENTOR
BY E. G. Siggers
ATTORNEY.
WITNESSES
F. B. Wooden
H. T. Chapman

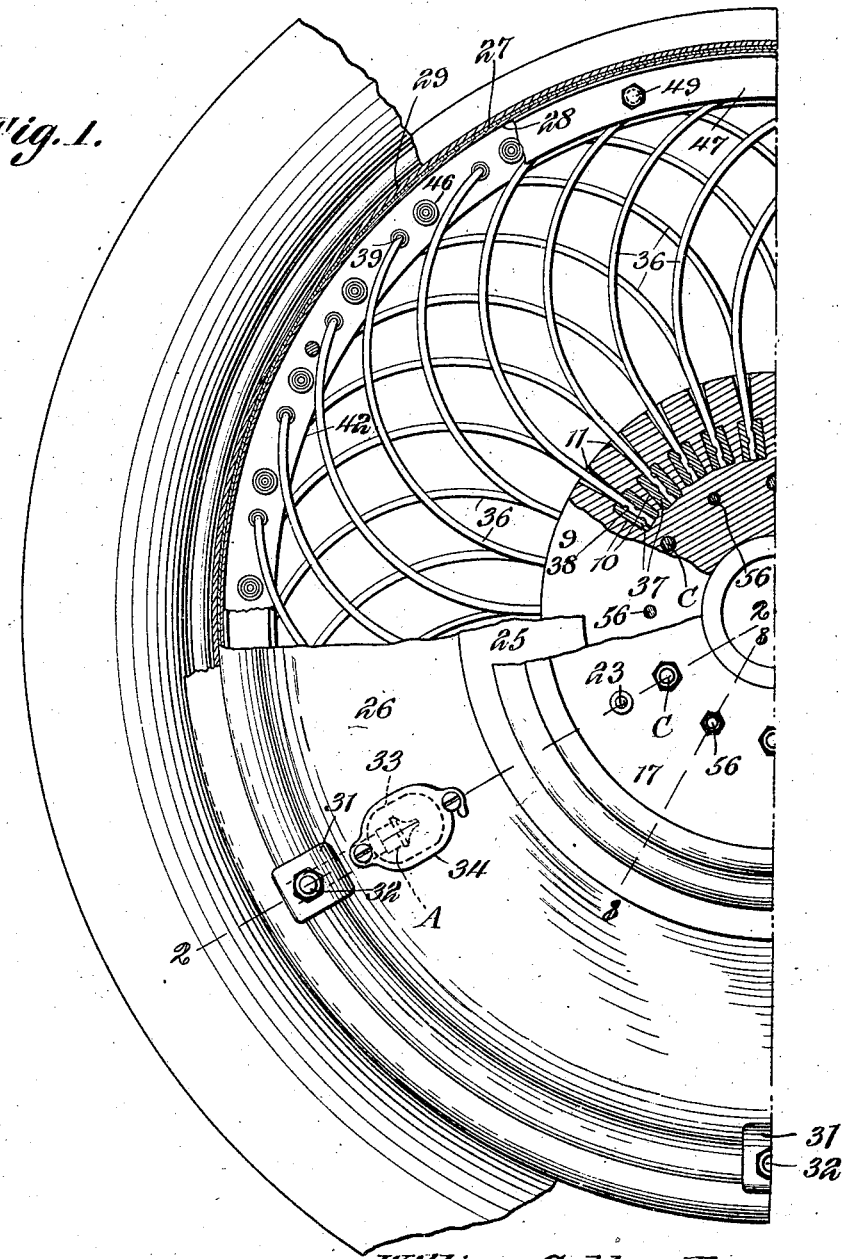

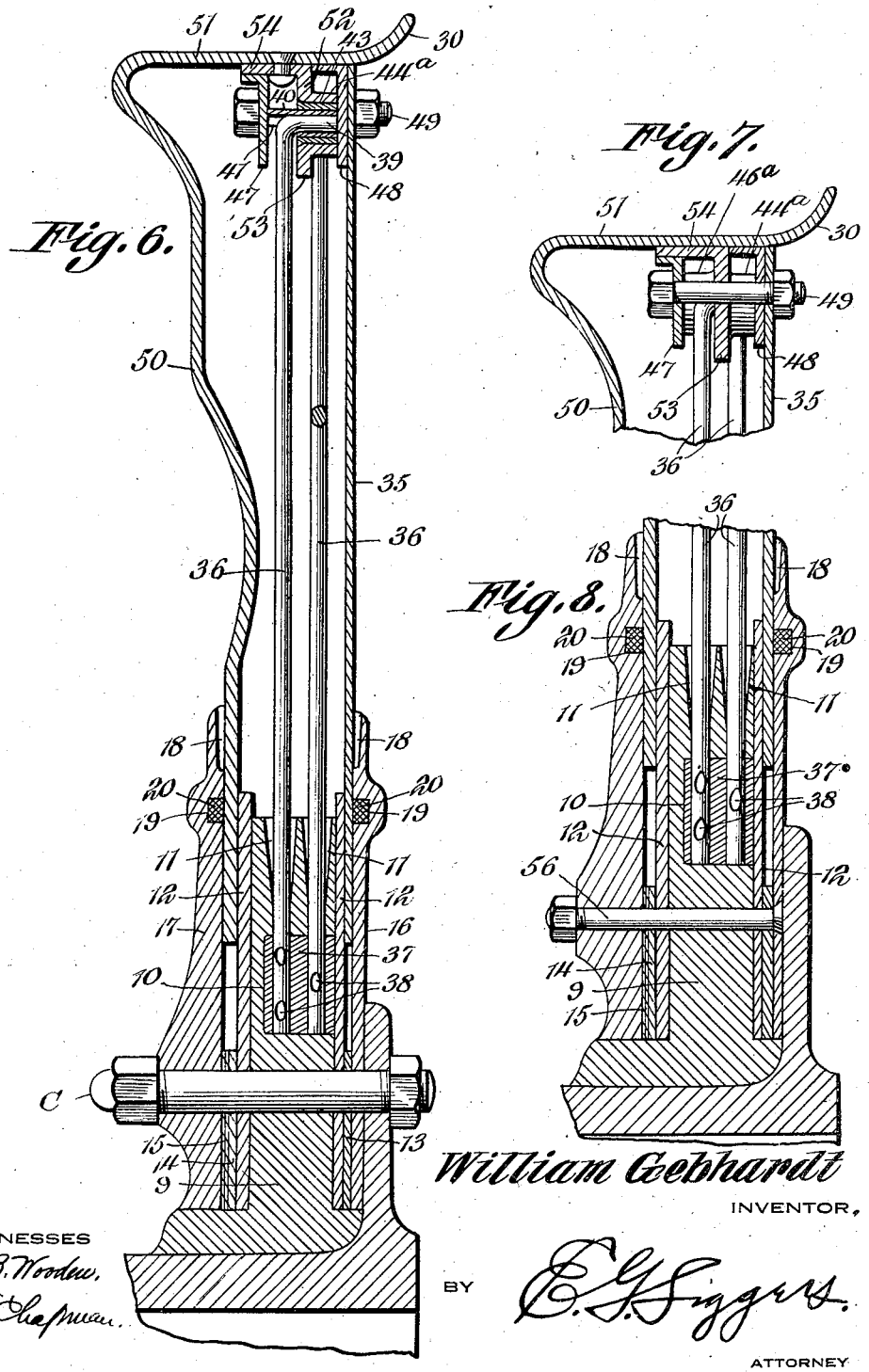

Patented Feb. 8, 1927.

1,617,209

UNITED STATES PATENT OFFICE.

WILLIAM GEBHARDT, OF SAN ANTONIO, TEXAS.

RESILIENT DISK WHEEL.

Application filed October 25, 1923. Serial No. 670,732.

This invention relates to vehicle wheels, particularly to those of the resilient disk type, and has for its object the provision of a disk connected with the outer or rim portion of the wheel, and provided with spring means for connecting it to the inner or hub portion, thus leaving the disk with its outer rim and tire free to move, subject to the action of the spring means, either vertically or circumferentially relatively to the hub portion, or vice versa. In the preferred construction, the hub portion is provided with flanges, which prevent lateral motion of the disk with its rim and tire relatively to the hub.

An important and more specific object is the provision of a resilient wheel, which includes two series of curved spring spokes, with the spokes of one series extending in the opposite direction to those of the other series, whereby an ample driving connection is provided between the central or hub portion and the outer or rim portion, which will permit the wheel to be used equally as well upon the rear as upon the front of an automobile or other power-driven vehicle.

A further object is the provision of novel means for securing the curved spring spokes to the hub portion, and other novel means for securing the spokes to the rim portion, these securing means being of such a construction as to retain the spokes in proper position and prevent any displacement while in use, and at the same time providing for the removal of a spoke in case replacement is necessary on account of breakage, or for any other reason.

Still another object is the provision of a spring wheel, in which provision is made for supporting means, in case any or all of the spokes should break, this supporting means further acting as a stop for preventing excessive compression of the spokes in case the wheel strikes an obstruction or rut and receives such a hard blow as would otherwise cause injury to the parts.

To the attainment of the foregoing the invention consists in the details of construction and arrangement of parts to be hereinafter more fully described and illustrated in the accompanying drawings which show merely the preferred embodiment of the invention, it being understood that the right is reserved to make such changes or modifications in the specific details of construction as will not depart from the spirit of the invention or the scope of the appended claims.

In the drawings:—

Figure 1 is a side elevation of a portion of a wheel constructed in accordance with my invention, parts being broken away and in section;

Figure 2 is a sectional view on the line 2—2 of Figure 1;

Figure 3 is a sectional view taken circumferentially of the wheel and showing the means for holding the outer ends of the spokes;

Figure 4 is a fragmentary view of the edge of the hub member;

Figure 5 is a detail perspective view of one of the spoke carried bushings;

Figure 6 is a cross sectional view, similar to Figure 2 showing a modified form of the invention;

Figure 7 is a detail sectional view showing the connection of the outer ends of the spokes with the rim as disclosed in Figure 6, this section being taken along the line of a securing bolt visible in Figure 6; and Figure 8 is a sectional view on the line 8—8 of Figure 1.

Referring more particularly to the drawings, I have shown my wheel as comprising a central hub member 9, of aluminum composition formed with a series of cavities 10, which extend to one face, and into each of which lead two radial holes 11 adapted to receive the inner ends of spokes 36. These holes 11 have their outer ends flared, as shown, so as to allow a certain freedom of movement to the spokes which prevents their bending or breaking at these points. In actual practice this hub member is formed as a casting with the cavities 10 cored out and the holes 11 drilled and reamed out. Disposed upon opposite sides of the hub member are bearing plates 12, against which are arranged spacing plates 13 and 14, the latter of which has, or may have, associated therewith a plurality of shims 15 which are for a purpose to be described. The hub portion of the device further includes outer cheek plates 16 and 17, which are disposed outwardly of the spacing plates 13 and 14, and have their outer portions cut away or outwardly offset, as indicated at 18 for the purpose of concealing the inner portions of the disks mounted between the cheek plates and from which the paint might be rubbed off by contact therewith. The opposed faces of the plates 16 and 17 are formed with circular grooves 19, within which are disposed packing strips 20 of felt, or other suitable similar material. It should also be mentioned that the plate 17 is formed with one or more lubricating holes 21, communicating with a passage 22 leading through the plate. The lubricating hole is normally closed by an outwardly spring pressed ball 23, retained in position by slightly closing the outer edge of the hole 21.

The wheel further includes a plate 25, which is arranged concentrically of the spacing plate 14, and which has a central opening of greater diameter than the spacing plate 14, so as to have sliding movement between the plate 17 and the adjacent plate 12 and in engagement with the packing strip 20. Plate 25 extends out beyond the cheek plate 17. Secured to the marginal portion of the plate 25, as for instance by riveting, is a disk 26, which has its outer portion extended laterally, as indicated at 27, and reinforced by an inner ring member 28 bolted or otherwise secured thereto. This specific formation is disclosed in Figure 2, though if preferred, I might dispense with the reinforcing member 28, as shown in Figures 6 and 7, in which event the disk 26 would naturally have to be formed of heavier material as the lateral portion 27 forms the support for the tire carrying rim which of course may be of any preferred type and which may be rigidly secured upon the lateral portion 27. In Figure 2, however, I have shown a rim 29 of the demountable type, seated upon the lateral portion 27 and prevented from lateral displacement in one direction by an outturned flange 30 and held against displacement in the other direction by lugs 31 held in association with the disk 26 by suitable bolts 32. The rim 29 is illustrated as being of the clincher type though I do not desire any limitation in this respect as it may be of the straight side or other type and may carry either a cushion tire or one of the pneumatic type, in which latter event access to the valve stem A may be had through an opening 33, normally closed by a door 34. The numeral 35 designates a second disk which is disposed at the other side of the wheel and which is slidably mounted between the plate 16 and the adjacent bearing plate 12 in engagement with the other packing strip 20. The disk 35 is likewise formed with a central hole of greater diameter than the spacing plate 13 about which it is concentrically disposed so as to permit the slidable movement and has its outer edge bearing against the inner surface of the lateral portion 27 which supports the rim.

Associated with the hub member 9 are two series of spokes 36 which are formed of spring steel wire and these spokes are curved, as shown, with all the spokes of one series having the same curvature and all those of the other series having the same curvature, but extending in the opposite direction, so that the spokes of the two series cross. The inner ends of the spokes extend through the holes 11 into the cavities 10 and are anchored in position by means of Babbitt metal 37, poured while in a molten state into the cavities 10, so as to imbed the inner ends of the spokes, which latter are moreover, formed with notches 38 to provide retaining means. The outer ends of the spokes are bent or extended laterally, as shown at 39, the extensions of one series being in the opposite direction to those of the other series. Secured upon the lateral portions of the spokes are bushings 40, see Fig. 5, each of which is formed as a cylindrical sleeve cut away throughout a portion of its length, as indicated at 41, the lateral extensions of the spokes being received within the uncut portions and the spokes proper passing through the cut-away portions. The free edge of the reinforcing member 28 is formed with a flange 42 which extends toward the center of the wheel and this flange has a series of holes 43 of a size to receive the bushings of one series of spokes. The holes 43 are surrounded by bearing flanges 44. The flange 42 is also formed with a second series of holes 45 surrounded by other flanges 46 and of a size to receive the bushings carried by the other series of spokes. The flanges 46 extend in the opposite direction to the flanges 44.

Disposed against the inner periphery of the reinforcing member 28 is a ring 47, which is L-shaped in cross section and which is formed in at least two sections circumferentially, whereby it may be inserted in place inwardly of the flange 42. The numeral 48 designates a second ring member of similar cross sectional configuration but made in only one piece and disposed outwardly of the flange 42. The ring 47 engages against the ends of the flanges 46 while the ring 48 engages against the ends of the flanges 44. A packing ring 48$^a$ is placed outside the ring 48, and all the rings are secured together by transversely disposed bolts 49. The rings 47 and 48 when in position engage against both ends of all of the bushings 40 for preventing displacement thereof.

In Figures 6 and 7 the construction is substantially the same as that of Fig. 2, except that the disk 50 which corresponds to the disk 26 is unprovided with the reinforcing member and has a lateral portion 51 carrying, on its inner periphery, a member 52 of ring shape including a flange 53 corresponding to and functioning in the same manner as the flange 42, and flanges 44$^a$ and 46$^a$ similar to the flanges 44 and 46, and further includes a flange 54 which is riveted or otherwise secured to the lateral portion 51 of the disk.

In assembling the wheel the spokes 36 are first inserted through the holes 11 and into the cavities 10, the two series of spokes being arranged in opposite directions, as indicated. The bushings 40 are disposed upon the outer lateral ends of the spokes and are inserted into the flange surrounded holes 43 and 45, in the member 28, after which the rings 47 and 48 are placed in position and held temporarily by means of the bolts 49. The wheel is then laid upon a suitable assembly block, not shown, and the arrangement of the spokes should be such that they will all be free of strain in any direction. Melted Babbitt metal is then poured into the cavities 10 which will result in anchoring the spokes firmly in place. One bearing plate 12 is then placed in position against the side of the hub 9 and the portion of the wheel thus far assembled is placed within the disk structure comprising the disks 25 and 26 and held by means of countersunk bolts 55 which pass through the lateral extension 27 and through the reinforcing member 28. The other bearing plate 12 is then placed in position against the other side of the hub and the disk 35 is next placed in position and fastened by being engaged upon the bolts 49. The members 42, 47 and 48, temporarily secured by the bolts 49 prior to insertion within the disk structure, are such that the nuts on these bolts must be removed when the disk 35 is to be secured to the member 48 and the nuts are then replaced to hold the parts together.

The spacing plates 13 and 14 together with the shims 15 are then placed in position and outwardly of these are placed the plates 16 and 17. The entire hub assembly is then secured together by means of countersunk bolts 56 which hold all the various plates in their proper position. After the wheel has been assembled as described, it is apparent that it may be readily associated with an ordinary hub structure, indicated at B, thus hub structure forming no part of the present invention, and being here shown as of the type having a plurality of bolts C, which are passed through suitable holes in the hub assembly and provided with nuts D.

In the use of the wheel there is relative radial movement of the rim portion with respect to the hub portion, this movement being opposed by the plurality of spring spokes 36 so that ample elasticity is provided for taking up shocks and jars incident to road travel for easy riding. In case the spoke should break or in case the wheel should strike against a large obstruction, or engage in a rut or the like, which might tend to compress the spokes to such a degree as to cause injury thereto, the disks 25 and 35 will engage against the outer edges of the spacing plates 13 and 14, which therefore, constitute stops limiting the degree of compression of the spokes. An advantageous feature is the fact that the rim is carried upon a lateral portion formed integrally upon one of the side disks of the wheel, this arrangement insuring strength and enabling the entire structure to withstand unusually severe lateral strains without danger of buckling. Owing to the fact that the holes 11 flare there is a certain freedom of movement of the spokes passing therethrough, which prevents bending and consequent crystallization and breaking of the spokes at these points. As the bushings 40 rotate within their respective containing holes, there is no binding at these points, which might cause injury. Lubricant may be supplied to the hub portion through the oil passage 21 and the oil or grease is thrown outwardly by centrifugal force, during the travel of the wheel, for effectually lubricating the connections of the spokes with the rim member. At the same time the felt packing strips serve to prevent any oil from creeping along the outer faces of the disks 26 and 35 and prevent the entrance of dirt, grit or water to the interior of the wheel. If, after long use, any looseness, or lateral play should develop, a portion of the wheel may be disassembled and one or more of the shims 15, be removed to take up the play.

Taking into consideration the specific construction and the inter-acting or co-operative relation of the various elements, it will be seen that a highly efficient wheel is produced, which is characterized by long life and satisfactory performance of all the functions, for which it is intended.

The spring means herein described, consisting of the curved resilient spokes, provide the necessary resiliency for softening or substantially eliminating all road shocks and vibrations due to unevenness in the road surface, and also all jerks due to uneven running of the motor, grabbing of the brake, or clutch, or to the sudden retarding or advancing of the spark or opening of the throttle. The softening of these vibrations protects all the parts connected with or supported by the axles, such as the drive shaft, differential, transmission and steering gear.

As a result of this construction, the tires may be pumped up to their full capacity, or to the pressure just suited for them, without resulting in undesirable vibrations in the body of the vehicle. The shocks due to the tires striking road obstructions are accordingly softened, and as a consequence the life of the tires, and of the entire vehicle, is prolonged, since it is the continual small shocks and vibrations which are most detrimental to the car, and cause the crystallization of the various parts, The wheel, as herein described, has all the advantages of the regular rigid type of disk wheel, in that the metal serves to conduct the heat away from the tires, and they are easy to clean and to keep clean, and the detrimental effects of the usual disk wheel due to its rigid construction, including the objectionable rumbling noise and the excessive wear on the tires and the various parts of the car, are avoided.

The resilient disk wheel constructed according to my invention also has a better traction than the rigid type. For example, when tested on a cement road or floor, by suddenly throwing in the clutch, the rigid type will slip or skid, while the resilient type will not. This improved result is no doubt due to a circumferential movement of the rim with respect to the hub portion which is permitted by the resilient connection, and which permits a more gradual pick-up.

What is claimed is:

1. A spring wheel comprising a rim member, a hub member, and a plurality of spring spokes connecting said members, the hub member being formed with cavities into which the inner ends of the spokes extend, said inner ends being retained by metal poured while molten into the cavities.

2. A spring wheel comprising a rim member, a hub member, and a plurality of spring spokes connecting said members, the hub member being formed with cavities into which the inner ends of the spokes extend, said inner ends being retained by metal poured while molten into the cavities, said inner ends of the spokes being formed with retaining notches.

3. A spring wheel comprising a rim member, a hub member and a plurality of spring spokes supporting the rim member, the hub member being formed with a plurality of cavities extending to one of its lateral faces and spaced inwardly from its periphery and formed with radial holes communicating with the cavities and through which the inner ends of the spokes extend into the cavities, and means within the cavities for embedding and anchoring the spokes.

4. A spring wheel comprising a rim member, a hub member, and a plurality of spring spokes connecting said members, the hub member being formed with a plurality of cavities extending to one face and spaced inwardly from its periphery and formed with radial holes communicating with the cavities and through which the spokes extend into the cavities, and means within the cavities for embedding the spokes, said means consisting of metal moulded into the cavities about the spokes.

5. A spring wheel comprising a rim member, a hub member, and a plurality of spring spokes connecting said members, the hub member being formed with a plurality of cavities extending to one lateral face and spaced inwardly from its periphery and formed with radial holes communicating with the cavities and through which the spokes extend into the cavities, and means within the cavities for embedding the spokes, the outer ends of said radial holes flaring so as to be out of contact with the spokes.

6. A spring wheel comprising a hub member, a pair of disks slidably engaging the side of the hub member, one disk being formed at its outer edge with an integral lateral portion constituting a rim support, the outer edge of the other disk abutting said lateral portion, and a plurality of curved spring spokes arranged in opposed series with each spoke swivelled at its outer end to the rim and having its inner end anchored in the hub.

7. In a spring wheel comprising a hub member, a rim member and a plurality of spring spokes connecting the hub and rim members, means for connecting the spokes with the rim member, including a ring secured upon the inner periphery of the rim member and formed with a series of bearing holes, the outer ends of the spokes being extended laterally, and located within said holes, and means at opposite sides of said ring for limiting longitudinal movement of said extension with respect to the holes.

8. In a spring wheel comprising a hub member, a rim member and a plurality of spring spokes connecting the hub and rim members, means for connecting the spokes with the rim member, including a ring secured upon the inner periphery of the rim member and formed with a series of bearing holes, surrounded by flanges, the outer ends of the spokes being laterally extended and carrying bushings received within said holes, and rings located at opposite sides of said ring and engaging the ends of said flanges and bushings.

9. In a spring wheel comprising a hub member, a rim member and a plurality of spring spokes connecting the hub and rim members, means for connecting the spokes with the rim member, including a ring secured upon the inner periphery of the rim member and formed with a series of bearing holes, surrounded by flanges, the outer ends of the spokes being laterally extended and carrying bushings received within said holes, and rings located at opposite sides of said ring and engaging the ends of said flanges and bushings, the extensions on the alternate spokes being in opposite directions and said flanges extending in alternately opposite directions.

10. A spring wheel comprising a rim, metallic spokes supporting said rim, and a hub having radial symmetrical holes in which the inner ends of the spokes are anchored, the sides of each hole being outwardly flared where the spoke emerges from the hub so as to permit play of the spokes without contact with the hub at that point.

11. A spring wheel comprising a hub portion with a series of cavities formed therein, holes extending radially from said cavities with their outer portions flared, spokes of uniform diameter extending through said holes and having their inner ends anchored in said cavities, and a rim supported at the outer ends of the spokes.

12. A spring wheel comprising a hub portion with a series of cavities extending from one of its lateral faces toward the opposite face, holes extending radially from said cavities with their outer portions increasing in diameter toward the periphery of the hub, spokes extending through said holes and having their inner ends anchored in said cavities, and a rim supported at the outer ends of the spokes.

13. A spring wheel provided with a hub portion, a rim portion and a plurality of curved resilient spokes arranged in opposed relation and including two series, the spokes of one series crossing those of the other series, each spoke being swiveled to the rim to turn on an axis perpendicular to the plane of the wheel, the inner end of each spoke being anchored in the hub, said hub having passages traversed by the spokes, the outer portion of each of said passages being flared outwardly to permit play of the spokes without contact with the hub at that point.

14. A spring wheel provided with a hub portion having circular series of cavities with each cavity provided with tapering entering passage, and two circular series of curved spokes entering the cavities through the tapering passages, swiveled connections between the outer ends of the spokes and the rim of the wheel, and anchoring means between the inner ends of the spokes and the cavities entered by the spokes, said anchoring means comprising metal which is cast in said cavities and in which the ends of the spokes are embedded.

In testimony, that I claim the foregoing as my own I have hereto affixed my signature.

WILLIAM GEBHARDT.